Jan. 16, 1934.   L. GOODMAN   1,944,124
SWIVEL COUPLING JOINT
Filed May 18, 1929
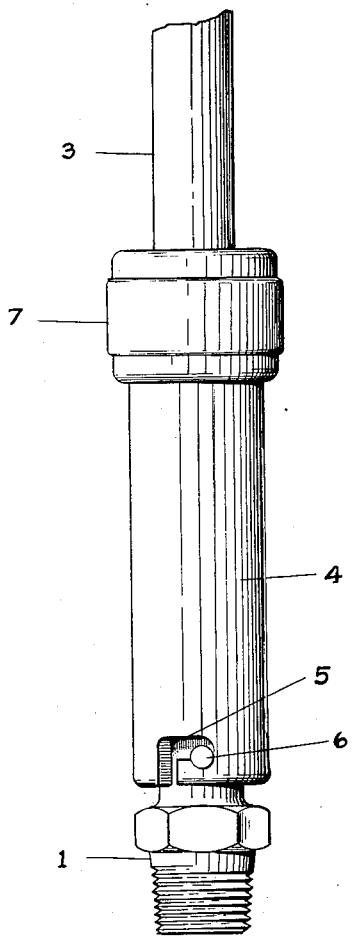
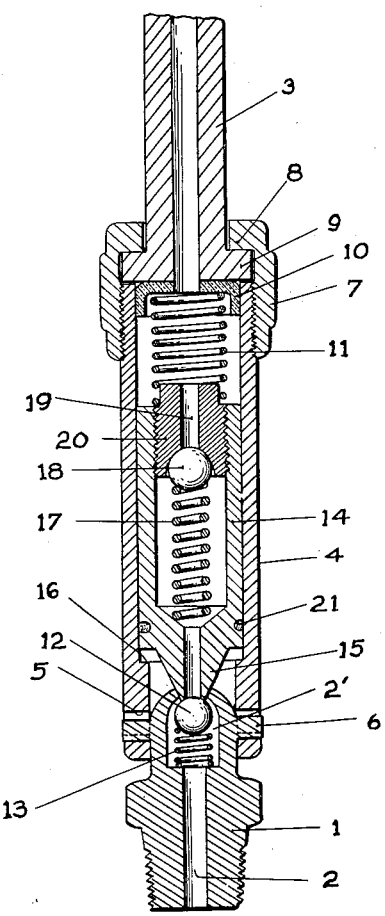
INVENTOR.
LOUIS GOODMAN
BY Miller Boyken Bried
ATTORNEYS.

Patented Jan. 16, 1934

1,944,124

UNITED STATES PATENT OFFICE 1,944,124

SWIVEL COUPLING JOINT

Louis Goodman, San Francisco, Calif., assignor to State Holding Co., Inc., a corporation of California Application May 18, 1929. Serial No. 364,087

4 Claims. (Cl. 285—175)

This invention relates to swivel pipe couplings in general, and in particular to the type wherein one of the coupling members couples to the other by means of a bayonet or other quick detachable joint, and the object of the invention is to provide an improved construction of such couplings whereby leakage at the coupled joint is prevented and the use of a gasket at the juncture of the two main coupling elements is entirely overcome.

With reference to the drawing accompanying this application, Fig. 1 is a side view of my coupling and Fig. 2 is a longitudinal cross section thereof.

In further detail 1 is a plug fitting having a through passage 2 and shown threaded so as to screw into any pipe line or opening, such as the grease hole in a bearing, which it is desired to swivelly connect to a conduit or pipe 3, the elements connecting the plug and pipe comprising a sleeve 4 provided at one end with bayonet slots 5 engaging trunnion pins 6 projecting from the plug, and at the other end with a collar 7 screwed to the sleeve and provided with an inwardly projecting flange 8 overhanging an external flange 9 on the end of pipe 3 and rotatably retaining flange 9 against the extreme end of sleeve 4 so that sleeve 4 may be freely swivelled with respect to pipe 3.

To seal the swivel joint I provide a cup washer 10 within the sleeve 4 bearing against its inner wall and the inner surface of flange 9 and resiliently held thereagainst by means of a light spring 11.

Plug 1 is provided at its receiving end with an internal check valve comprising a ball 12 forced outwardly to seat against and close the plug opening, by means of a light spring 13 seated against a shoulder in the bore of the plug formed by an enlargement 2' thereof in which the spring and ball are positioned.

It is the end of this plug or the sealing thereof to the remainder of the coupling which has heretofore caused trouble, as a gasket usually a cup leather, has always been used to bear against the end of the plug, but since the plug 1 is usually left permanently attached to a bearing or other device in which it is desired to force grease and is often covered with foreign matter such as hardened lumps of dirt and grease, cup leathers or other gasket joints are sometimes ineffective in sealing the joint against high internal pressures used in the pipe, and to overcome which trouble I dispense entirely with gaskets or cup leathers of any kind at this point and provide a conical metal to metal contact coupling joint effected by the provision within shell 4 of a floating tubular union piece 14 provided with a conical nozzle 15 adapted to enter and fit tightly and seat within the receiving end of plug 1 and form a metal contact tight joint without any gasket, and when seated to push the ball 12 away from its seat so that anything being pumped through the pipe can freely enter the plug and thence to any device or passage-way to which the plug is attached.

The tubular conical nozzle piece 14—15 is cylindrical and preferably ground to a nice sliding fit within the bore of shell 4 and is limited in its outward sliding movement therein through means of a shoulder 16 and urged thereagainst by the spring 11 bearing against the end of the portion 14.

Within the tubular nozzle piece is a spring 17 bearing against a ball 18 closing the inlet opening 19 in a plug 20 screwed within the end of portion 14 of the nozzle piece, while adjacent the discharge end of the nozzle piece may be a circumferential groove 21 filled with a strand of wicking, though this is not necessary if the sliding fit of the nozzle is close.

With the construction as described and the parts coupled as shown it will be manifest that a fluid such as grease coming under pressure from pipe 3 will react against the relatively large exposed end of nozzle piece 14 and force same forward to tightly wedge the conical nozzle end 15 into sealed contact within the receiving opening of plug 1, and that increased pressure on the fluid will open ball valve 18 and then ball valve 12 to afford a passage for the flow of fluid, and that upon stopping the flow of fluid both ball valves will close and the coupling may be quickly detached at the bayonet joint.

It is evident without further drawing that instead of the bayonet joint the sleeve 4 and plug-receiving end may be threaded to simply screw together if desired, as a bayonet joint is in effect only a partial thread.

In forming the plug portion (1) of my coupling I preferably spin or press the receiving end over to form the valve seat, after inserting the spring and ball and supporting the ball from below through bore 2 so that a perfect matching seat for the ball will result.

I claim:

1. A coupling joint for connecting a pipe section and an apertured plug comprising an elongated tubular sleeve provided with means at one end adapted to swivelly connect to an end of the pipe section and means at the opposite end for connecting to the plug, an elongated tubular metallic nozzle within the sleeve arranged with substantially its entire outer surface in direct sliding contact with the inner surface of the sleeve and means yieldably urging the nozzle toward the plug, the end of said nozzle adjacent the plug being tapered to make a direct contact within the aperture of the plug.

2. A tubular pipe coupling adapted to couple to an apertured plug at one end and to a pipe section at the opposite end, an elongated floating metallic cylinder of substantially uniform outer diameter within said coupling arranged with substantially its entire outer surface in sliding contact with the inner surface of the coupling, said cylinder provided with a conical end adapted to form a metallic sealed joint with the walls of the aperture in the plug, said cylinder having a straight passageway longitudinally therethrough, a spring actuated check valve in said passageway, means yieldably closing the valve in a direction toward the pipe section and means yieldably urging said cylinder toward the plug.

3. A pipe section, an elongated tubular sleeve swivelly mounted at one end to the end of the pipe section arranged in longitudinal extension therewith, means at the opposite end of the sleeve for connecting the same to an apertured plug, a floating tubular metallic nozzle within the sleeve provided with a conical outer end, said tubular nozzle being an elongated cylinder of substantially uniform outer diameter and arranged with substantially its entire outer surface in sliding contact with the inner surface of the sleeve, a passageway extending longitudinally through said tubular nozzle, said passageway being of restricted diameter through the conical end of the nozzle and the remainder of the passageway being of enlarged uniform diameter, a removable valve seat secured within the passageway at the end opposite the restricted end thereof provided with an aperture therethrough in axial alignment with the passageway, and a spring actuated check valve within the enlarged portion of the passageway adapted to seat over aperture in the valve seat.

4. A coupling joint for connecting a pipe section and an apertured plug comprising an elongated tubular sleeve provided with means at one end adapted to swivelly connect to an end of the pipe section and means at the opposite end for connecting to the plug, an elongated metallic nozzle reciprocable within the sleeve, said nozzle arranged with substantially its entire outer surface in direct sliding contact with the inner surface of the sleeve, the end of said nozzle adjacent the plug being tapered to project into the aperture of said plug and to make a direct contact at its sides with the edges of the plug aperture.

LOUIS GOODMAN.